United States Patent
Yagnik et al.

(10) Patent No.: US 8,340,449 B1
(45) Date of Patent: Dec. 25, 2012

(54) THREE-DIMENSIONAL WAVELET BASED VIDEO FINGERPRINTING

(75) Inventors: Jay Yagnik, Mountain View, CA (US); Henry A. Rowley, Sunnyvale, CA (US); Sergey Ioffe, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/250,494

(22) Filed: Sep. 30, 2011

Related U.S. Application Data

(63) Continuation of application No. 11/746,339, filed on May 9, 2007, now Pat. No. 8,094,872.

(51) Int. Cl.
*G06K 9/00* (2006.01)
*G06K 9/46* (2006.01)

(52) U.S. Cl. ........................................ 382/251; 382/248

(58) Field of Classification Search .................. 382/100, 382/118, 207, 232, 248, 251; 380/26, 54, 380/201, 210, 287; 713/173
See application file for complete search history.

(56) References Cited

U.S. PATENT DOCUMENTS

| | | | |
|---|---|---|---|
| 5,673,332 A | 9/1997 | Nishikawa et al. | |
| 5,987,094 A | 11/1999 | Clarke et al. | |
| 6,760,536 B1 * | 7/2004 | Amir et al. | 386/344 |
| 6,778,709 B1 | 8/2004 | Taubman | |
| 7,185,200 B1 * | 2/2007 | Levine et al. | 713/176 |
| 7,277,468 B2 | 10/2007 | Tian et al. | |
| 7,343,025 B2 | 3/2008 | Seo et al. | |
| 7,529,420 B2 | 5/2009 | Li | |
| 7,702,127 B2 | 4/2010 | Mihcak et al. | |
| 7,724,917 B2 | 5/2010 | Isogai | |
| 7,903,868 B2 | 3/2011 | Kim et al. | |
| 7,936,824 B2 | 5/2011 | Lee | |
| 8,050,454 B2 * | 11/2011 | Yi et al. | 382/103 |
| 8,085,995 B2 * | 12/2011 | Yagnik | 382/118 |
| 8,094,872 B1 * | 1/2012 | Yagnik et al. | 382/100 |
| 2002/0009233 A1 | 1/2002 | Pesquet-Popescu | |
| 2002/0150164 A1 * | 10/2002 | Felts et al. | 375/240.19 |
| 2003/0202660 A1 | 10/2003 | Zhou et al. | |

(Continued)

FOREIGN PATENT DOCUMENTS

JP 2003-242281 A 8/2003

OTHER PUBLICATIONS

Sumbera et al. "Wavelet Transform using Haar Wavelets" MSOE CS-4802 Final Project Feb. 2001 p. 1-20.*

(Continued)

*Primary Examiner* — David Zarka
*Assistant Examiner* — Mia M Thomas
(74) *Attorney, Agent, or Firm* — Fenwick & West LLP

(57) ABSTRACT

A method and system generates and compares fingerprints for videos in a video library. The video fingerprints provide a compact representation of the spatial and sequential characteristics of the video that can be used to quickly and efficiently identify video content. Because the fingerprints are based on spatial and sequential characteristics rather than exact bit sequences, visual content of videos can be effectively compared even when there are small differences between the videos in compression factors, source resolutions, start and stop times, frame rates, and so on. Comparison of video fingerprints can be used, for example, to search for and remove copyright protected videos from a video library. Further, duplicate videos can be detected and discarded in order to preserve storage space.

20 Claims, 10 Drawing Sheets

U.S. PATENT DOCUMENTS

| | | | |
|---|---|---|---|
| 2004/0030615 | A1 | 2/2004 | Ling |
| 2005/0008190 | A1* | 1/2005 | Levy et al. ............. 382/100 |
| 2005/0105801 | A1* | 5/2005 | Periaswamy ............ 382/192 |
| 2005/0125845 | A1 | 6/2005 | Hardt et al. |
| 2005/0154892 | A1* | 7/2005 | Mihcak et al. ............ 713/176 |
| 2006/0088224 | A1 | 4/2006 | Lee |
| 2006/0110005 | A1 | 5/2006 | Tapson |
| 2007/0220575 | A1 | 9/2007 | Cooper et al. |
| 2007/0288518 | A1 | 12/2007 | Crigler et al. |
| 2008/0080756 | A1* | 4/2008 | Periaswamy ............ 382/128 |
| 2008/0080771 | A1* | 4/2008 | Periaswamy ............ 382/192 |
| 2008/0127340 | A1 | 5/2008 | Lee |
| 2008/0159590 | A1* | 7/2008 | Yi et al. ............ 382/103 |
| 2009/0125310 | A1 | 5/2009 | Lee et al. |
| 2011/0258049 | A1 | 10/2011 | Ramer et al. |
| 2012/0123786 | A1 | 5/2012 | Valin et al. |
| 2012/0136793 | A1 | 5/2012 | Valin et al. |

OTHER PUBLICATIONS

Meyer, F. "Fast Adaptive Wavelet Packet Image Compression" IEEE Transactions on Image Processing. Apr. 1998, pp. 1-31.*

Muhsen et al. "Wavelet and Optimal Requantization Methodology for Lossy Fingerprint Compression" The International Arab Journal of Information Technology Vo. 8, No. 4 Oct. 2011, pp. 1-5.*

Chinese Office Action, Chinese Application No. 200780046460.6, Apr. 13, 2012, 21 pages.

Japanese Office Action, Japanese Application No. P2009-535496, Feb. 28, 2012, 13 pages.

Kishigami, J. et al., "Trend on Content Business," Report of Institute of Information Processing's Research, Institute of Information Processing, Nov. 18, 1999, pp. 37-42, vol. 99, No. 94.

"YouTube tied up with CBS, SONY BMG and UMG," ITmedia News, Japan, ITmedia Kabushikikaisha, Oct. 10, 2006, 1 page, Retrieved from the Internet<URL:http://www.itmedia.co.jp/news/articles/0610/10news063.html>.

United States Office Action, U.S. Appl. No. 12/968,825, Aug. 6, 2012, 17 pages.

United States Office Action, U.S. Appl. No. 12/968,825, Apr. 12, 2012, 18 pages.

United States Office Action, U.S. Appl. No. 12/968,825, Oct. 7, 2011, 19 pages.

* cited by examiner

THREE-DIMENSIONAL WAVELET BASED VIDEO FINGERPRINTING

CROSS-REFERENCE TO RELATED APPLICATION

This application is a continuation of U.S. patent application Ser. No. 11/746,339, filed May 9, 2007, which is incorporated by reference herein in its entirety.

BACKGROUND

1. Field of Art

The invention generally relates to video processing, and more specifically to video fingerprinting.

2. Description of the Related Art

Electronic video libraries may contain thousands or millions of video files, making management of these libraries an extremely challenging task. The challenges become particularly significant in the case of online video sharing sites where many users can freely upload video content. In some cases, users upload unauthorized copies of copyrighted video content, and as such, video hosting sites need a mechanism for identifying and removing these unauthorized copies. While some files may be identified by file name or other information provided by the user, this identification information may be incorrect or insufficient to correctly identify the video. An alternate approach of using humans to manually identifying video content is expensive and time consuming.

Another problem faced by video sharing sites is that users may upload multiple copies of video content to the site. For example, popular items such as music videos may be uploaded many times by multiple users. This wastes storage space and becomes a significant expense to the host. A third problem is that due to the large number of files, it is very difficult to organize the video library based on video content. Thus, search results may have multiple copies of the same or very similar videos making the results difficult to navigate for a user.

Various methods have been used to automatically detect similarities between video files based on their video content. In the past, various identification techniques (such as an MD5 hash on the video file) have been used to identify exact copies of video files. Generally, a digital "fingerprint" is generated by applying a hash-based fingerprint function to a bit sequence of the video file; this generates a fixed-length monolithic bit pattern—the fingerprint—that uniquely identifies the file based on the input bit sequence. Then, fingerprints for files are compared in order to detect exact bit-for-bit matches between files. Alternatively, instead of computing a fingerprint for the whole video file, a fingerprint can be computed for only the first frame of video, or for a subset of video frames. However, each of these methods often fail to identify videos uploaded by different users with small variations that change the exact bit sequences of the video files. For example, videos may be uploaded from different sources and may vary slightly in how they are compressed and decompressed. Further, different videos may have different source resolutions, start and stop times, frame rates, and so on, any of which will change the exact bit sequence of the file, and thereby prevent them from being identified as a copy of an existing file.

Other attempts to solve the described problems have involved applying techniques related to finding duplicate images. In these techniques individual frames of the video are treated as separate and independent images. Image transforms are performed to extract information representing spatial characteristics of the images that are then compared. However, there are two main weaknesses in this technique when trying to handle video. First, video typically contains an enormous number of image frames. A library may easily contain thousands or millions of videos, each having frame rates of 15 to 30 frames per second or more, and each averaging several minutes in length. Second, directly applying image matching techniques to video ignores important sequential information present in video. This time information is extremely valuable in both improving detection of duplicates and reducing the amount of data that needs to be processed to a manageable quantity, but is presently ignored by most techniques.

In view of the problems described above, an improved technique is needed for finding similarities between videos and detecting duplicate content based on the perceived visual content of the video. In addition, a technique is needed for comparing videos that is unaffected by small differences in compression factors, source resolutions, start and stop times, frame rates, and so on. Furthermore, the technique should be able to compare and match videos automatically without relying on manual classification by humans.

SUMMARY

A method and system generates and compares fingerprints for videos in a video library using fingerprints that represent spatial information within certain frames of the video, as well as sequential information between frames. The methods for generating video fingerprints provide a compact representation of the spatial and sequential characteristics that can be used to quickly and efficiently identify video content. The methods also allow for comparing videos by using their fingerprints in order to find a particular video with matching content (such as, for example, to find and remove copyright protected videos or to find and remove duplicates). In addition, the methods enable organizing and/or indexing a video library based on their visual content by using video fingerprints. This can provide improved display of search results by grouping videos with matching content.

A video fingerprint is generated by applying a three-dimensional transform to a video segment. The video fingerprint represents both the spatial characteristics within the frames of the video segment and sequential characteristics between frames; the transform is said to be three-dimensional because the spatial information within frames provides two dimensions of information, while the sequential information provide the third dimension of temporal information. Furthermore, because the fingerprint is based on the spatial and sequential characteristics of the video segment rather than an exact bit sequence, video content can be effectively compared even when videos have variations in compression factors, source resolutions, start and stop times, frame rates, and so on. A set of fingerprints associated with each segment of a video provide a fingerprint sequence for the video.

The set of video fingerprints for a received video can be compared against reference fingerprints for videos stored in a reference database. In this manner, matching videos can be efficiently located. This is useful for at least two reasons. First, when a video is uploaded to a file sharing site, it may be immediately checked against all videos in the library. If matches are found, the video can be properly indexed in order to eliminate presentation of duplicates in search results. Alternatively, it may be desirable to discard the uploaded video if any matches are found and only accept new entries to the library that are unique. Second, if a video is known to be copyright protected, its fingerprint can be used to efficiently search for visually identical videos in the library so that copyrighted material can be removed.

A system for detecting duplicate video content includes an ingest server, a fingerprinting module, an indexing module, a matching module, and a reference database. The ingest server receives an input video from a video source and provides the video to the fingerprinting module, which generates a fingerprint sequence for the ingest video. Each fingerprint in the fingerprint sequence is indexed by the indexing module according to one or more hash processes which selectively reduce the dimensionality of the fingerprint data. A matching module compares fingerprints and/or fingerprint sequences in the reference database to the fingerprint sequence associated with the ingest video and determines if a match is found. The matching module may be used both to locate particular video content from a query and to organize video search results based on their content.

Fingerprints can be generated using various techniques provided that each fingerprint is based upon the intra-frame spatial and inter-frame sequential (temporal) characteristics of the video. In one described embodiment, a system for generating a video fingerprint sequence includes a normalization module, a segmenting module, a transform module, and a quantization module. The normalization module converts received videos to a standard format for fingerprinting. The segmenting module segments the normalized video into a number of segments, each segment including a number of frames. Each segment of frames is separately transformed by the transform module in the horizontal, vertical, and time dimensions. This three-dimensional transform computes frequency information about edge differences in the spatial and temporal dimensions. The result is a three-dimensional array of coefficients that will be unique to the spatial and sequential characteristics of the group of frames. A Haar wavelet transform provides one example of a transform that can be used for this purpose; various other transforms may also be utilized. A quantizing module quantizes the three-dimensionally transformed segment in order to reduce the amount of data while still preserving the spatial and sequential characteristics of the video. The quantized transform results provide a video fingerprint for each video segment. A fingerprint sequence for the video is formed from the ordered set of fingerprints of the video segments.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
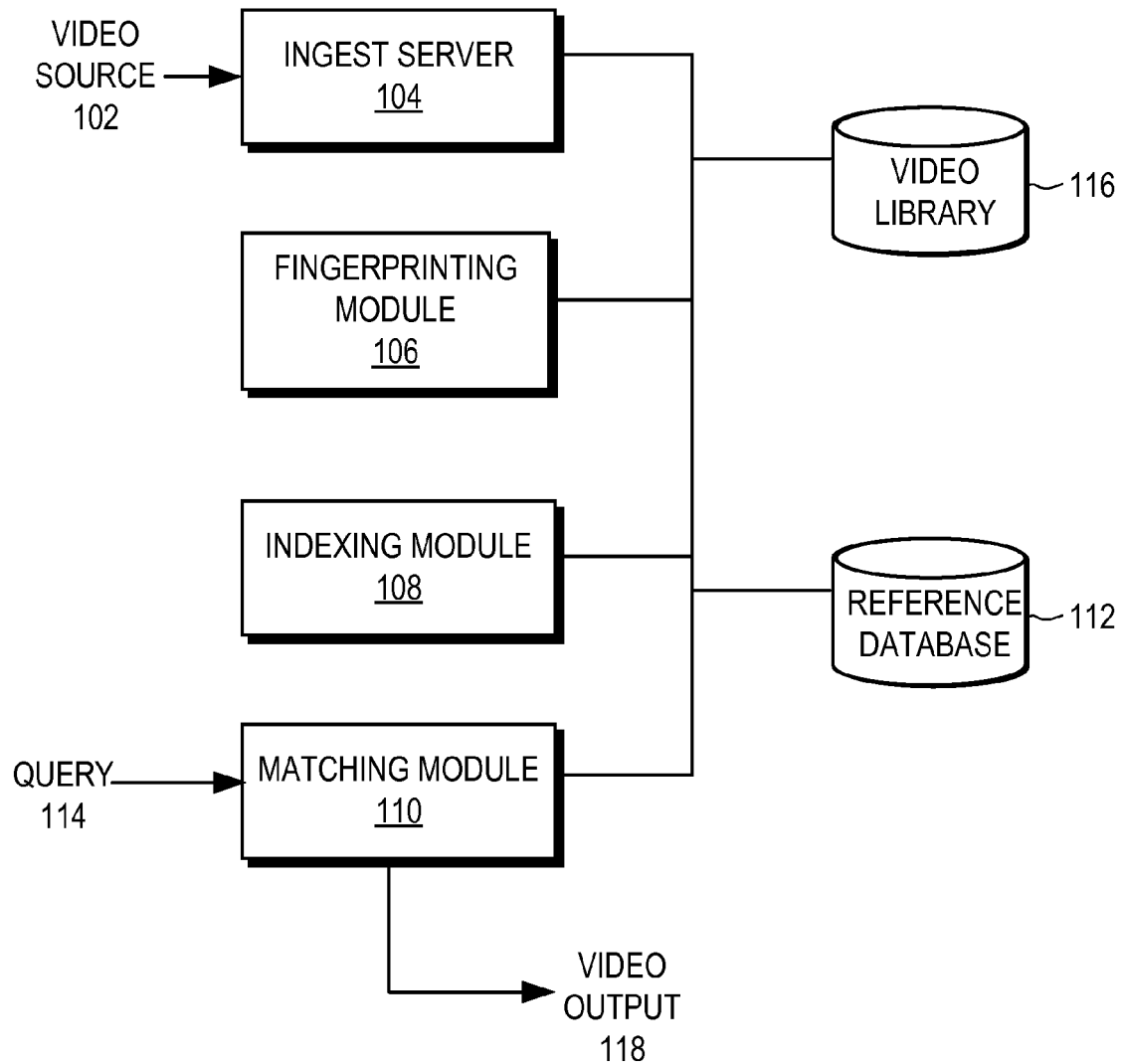
FIG. 1 is a high level block diagram illustrating a system for comparing video content in video library.

FIG. 1 is a high-level block diagram illustrating a system for comparing video content. The system comprises an ingest server 104, a fingerprinting module 106, an indexing module 108, a matching module 110, a reference database 112, and a video library 116. In alternative configurations, different or additional modules may be used.

The ingest server 104 is adapted to receive one or more videos from a video source 102. The video source 102 can be, for example, a client computer coupled to the ingest server 104 through a network. In this configuration, a user can upload video content to the ingest server 104 from a remote location. Alternatively, the video source 102 can be a database or other storage device coupled to the ingest server 104. For example, the video source 102 can be a video storage medium such as a DVD, CD-ROM, Digital Video Recorder (DVR), hard drive, Flash memory, or other memory. The ingest server 104 may also be coupled directly to a video capture system such as a video camera.

The ingest server 104 stores the received videos to the video library 116. The ingest server 104 can also pass received videos directly to the fingerprinting module 106 for fingerprinting immediately upon receipt. The ingest server 104 pre-processes the received video to convert it to a standard format for storage in the video library 116. For example, the ingest server 104 can convert the frame rate, frame size, and color depth of a received video to predetermined formats. For example, storage format can be Adobe FLASH®, with a frame size of 320×240 at 15 fps, and 8 bit color.

The fingerprinting module 106 receives a video from the ingest server 104 or from the video library 116 and generates a sequence of fingerprints associated with the video. Typically, the fingerprint module 106 divides the received video into multiple overlapping segments with each segment comprising a number of video frames, and a fingerprint is separately generated for each segment. Each fingerprint compactly represents spatial information within the group of video frames in the video segment and sequential characteristics between frames of the video segment. The fingerprint uniquely identifies a video segment based on its visual content such that minor variations due to compression, de-compression, noise, frame rate, start and stop time, source resolutions and so on do not significantly affect the fingerprint generated for the video segment. The complete ordered set of video fingerprints for the segments of a video provides a fingerprint sequence for the video.

The indexing module 108 receives the video fingerprint sequences for each video from fingerprinting module 106 and indexes the fingerprint sequences into the reference database 112. The indexing process can use a variety of different hash techniques to generate a signature for a fingerprint that uniquely identifies the fingerprint while fixing the size of the fingerprint data. The signature is broken into signature blocks and indexed in hash tables. Indexing beneficially reduces the number of bit comparisons needed to compare two fingerprints. Thus, searches for matching fingerprints can be accelerated relative to direct bit-for-bit comparisons of fingerprints.

The matching module 110 compares videos or video segments and generates a matching score indicating the likelihood of a match. The matching module 110 compares the fingerprint sequence of an ingest video to reference fingerprint sequences stored in the reference database 112. Alternatively, the matching module 110 compares fingerprint sequences in the reference database 112 corresponding to two or more videos stored in video library 116. The matching module 110 may further receive a search query from a user requesting particular content and output a video 118 from the video library 116 that matches the query 114.

The video library 116 is a storage device for storing a library of videos. The video library 116 may be any device capable of storing data, such as, for example, a file server, a hard drive, a writeable compact disk (CD) or DVD, or a solid-state memory device. Videos in the video library 116 are generally received from the ingest server 104 and can be outputted to the fingerprinting module 106 for fingerprinting. Videos are also outputted 118 by the matching module 110 that are relevant to a search query 114.

The reference database 112 stores the indexed fingerprints for each video in the video library 116. Each entry in the reference database 112 corresponds to signature blocks generated in the indexing process. Each entry is mapped to unique identifiers of the video segments corresponding to each signature block. The reference database 112 can be searched by the matching module 110 to quickly compare fingerprints and/or fingerprint sequences.

The described system can implement several usage scenarios. A first scenario enables the system to query-by-video to find identical or similar videos to a selected video. Here, a system operator provides an input query 114 to the matching module 110. The input query 114 is in the form of a video having particular content of interest such as, for example, video content that is copyright protected. A fingerprint sequence is generated for the copyright protected video and the reference database 112 is searched for matching fingerprints. Unauthorized copies can then be removed from the video library 116 (or otherwise processed) if the matching module 110 detects a match. In addition, new uploads can be automatically screened for unauthorized copies of known copyrighted works. Here, a newly uploaded video is fingerprinted and the fingerprint sequence is compared against fingerprint sequences for the known copyrighted videos. Then, matching uploads are blocked from storage in the video library 116. In one embodiment, the video can be processed in pieces as it is received so that so that the full video need not be received before processing begins.

In a second scenario, the system is used to detect and remove multiple copies of video content from the video library 116. Duplicate or near duplicate videos may be found within the video library 116, or new videos uploaded by the ingest server 104 may be automatically compared against videos in the video library 116. Duplicate videos found in the video library 116 are removed in order to save storage space. In one embodiment, if a new video is received that already has a duplicate in the video library 116, the new video is simply discarded.

In another scenario, the system can be used to provide organized search results of videos. In this scenario, a user provides an input query 114 and the matching module 110 returns relevant video results. The input query 114 can be in the form a conventional text-based search query or can be in the form of a video file as described previously. Using their fingerprint sequences, video results are compared to one another by the matching module 110 and matching videos are grouped together in the search results.

Figure 2:
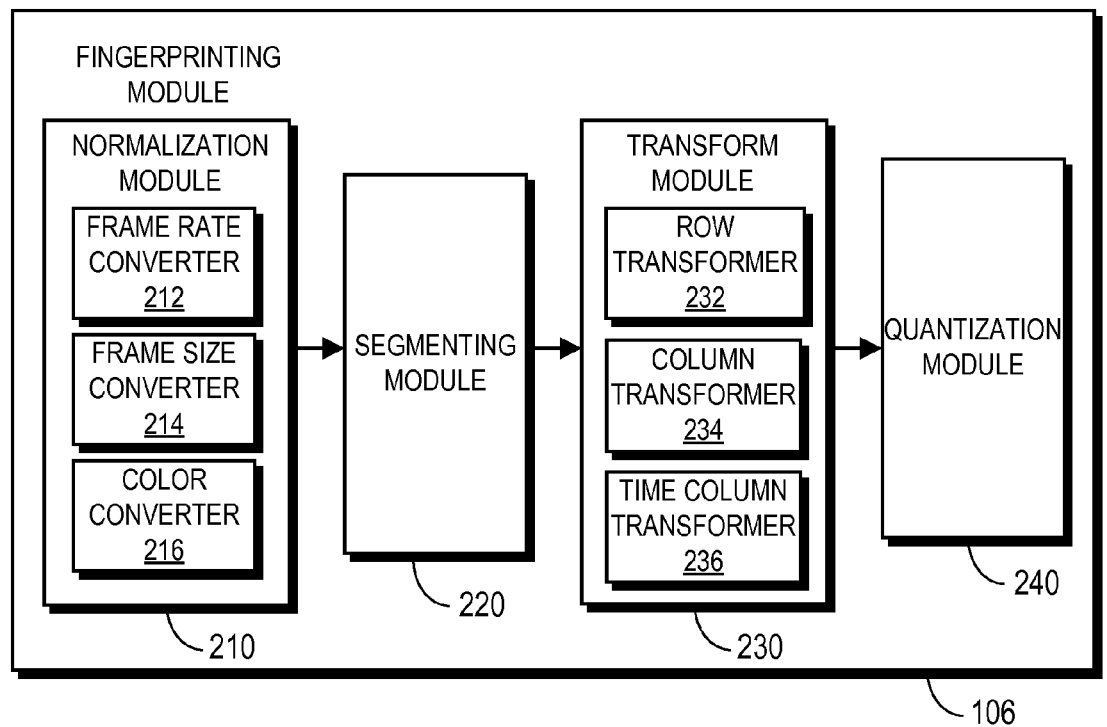
FIG. 2 is a block diagram illustrating an architecture for generating a video fingerprint.

Referring now to FIG. 2, an embodiment of a fingerprinting module 106 for generating fingerprints of a received video is illustrated. The fingerprinting module 106 is adapted to receive an input video that has been pre-processed by the ingest server 104, and generate one or more fingerprints representing spatial and sequential characteristics associated with the video. The fingerprinting module 106 comprises a normalization module, 210 a segmenting module 220, a transform module 230, and a quantization module 240. In alternative configurations, the fingerprinting module 106 can have additional or different modules than those illustrated.

Figure 3:
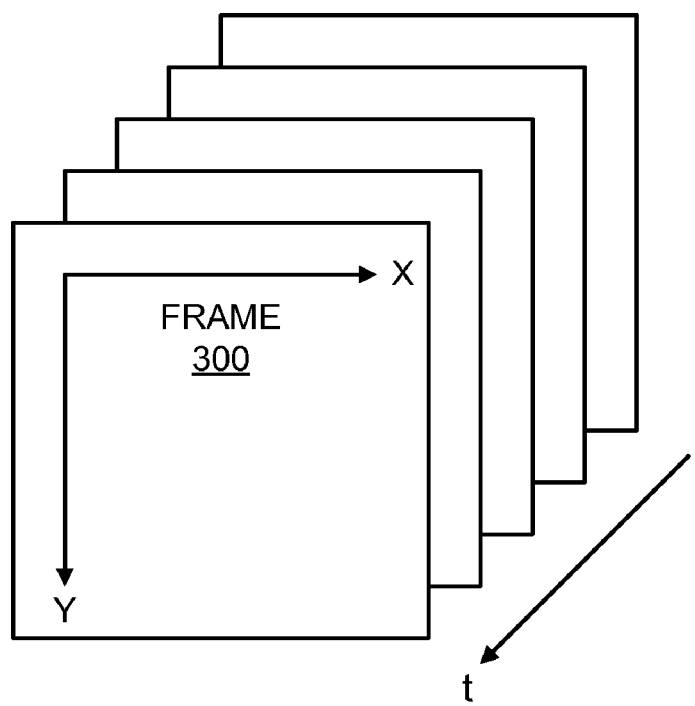
FIG. 3 is a diagram illustrating a video structure as a series of frames.

An example structure for a video received by the fingerprinting module 106 is provided in FIG. 3. The video comprises a series of frames 300. Each frame 300 comprises an image having a plurality of pixels arranged in a two-dimensional grid (for example, in an X direction and a Y direction). The frames 300 are also arranged sequentially in time (the t direction). Thus, a video comprises both spatial information, defined by the arrangement of pixels in the X and Y directions, and sequential or temporal information defined by how the pixels change throughout the time (t) dimension.

Turning back to FIG. 2, the normalization module 210 generally standardizes the data to be processed during fingerprinting. The normalization module 210 includes a frame rate converter 212, a frame size converter 214 and color converter 216 to normalize video to a predetermined format for fingerprinting. Converting video to a standardized fingerprint format ensures that videos are consistent and can produce comparable results. Often, frame rate, frame size, and color information are reduced by the normalization module 210 in order to improve the speed and power efficiency of the fingerprinting process. For example, the normalization module 210 can convert the video to luminance (grayscale) values without color, reduce the frame rate to 15 fps, and reduce the frame size to 64×64. To simplify computation, the number of pixels in each row and column of the frame size is preferably a power of 2 (e.g., 64×64) but any frame size is possible. Each of the standard formats used by the normalization module 210 may be predetermined or may be determined dynamically based on various constraints such as, for example, available power, available bandwidth, or characteristics of the received video.

The segmenting module 220 receives the normalized video from the normalization module 210 and divides the video into a number of segments with each segment including a number of frames. The segments may be stored, for example, in temporary buffers and outputted separately to the transform module 230. The segments preferably overlap by some number of frames.

The transform module 230 operates on the video segments obtained from the segmenting module 220. The transform module 230 comprises a row transformer 232, a column transformer 234, and a time column transformer 236 for performing a three-dimensional transform on each video segment. This three-dimensional transform computes frequency information about edge differences in two spatial dimensions and one temporal dimension. Because the transform results are based on the spatial and sequential characteristics rather than an exact bit sequence, the fingerprint can identify a video segment based on its content even in the presence of variations in compression factors, source resolutions, start and stop times, frame rates, and so on. The output of the transform module 230 is a three-dimensional array of coefficients that will be unique to the spatial and sequential characteristics of the group of frames in each video segment.

A quantization module 240 quantizes the three-dimensionally transformed segment in order to standardize the data size while still preserving the spatial and sequential characteristics of the video. Additionally, the quantization module 240 encodes and flattens the transformed coefficient array to a one-dimensional bit vector. The one-dimensional bit vector provides a fingerprint for an individual video segment.

Figure 4:
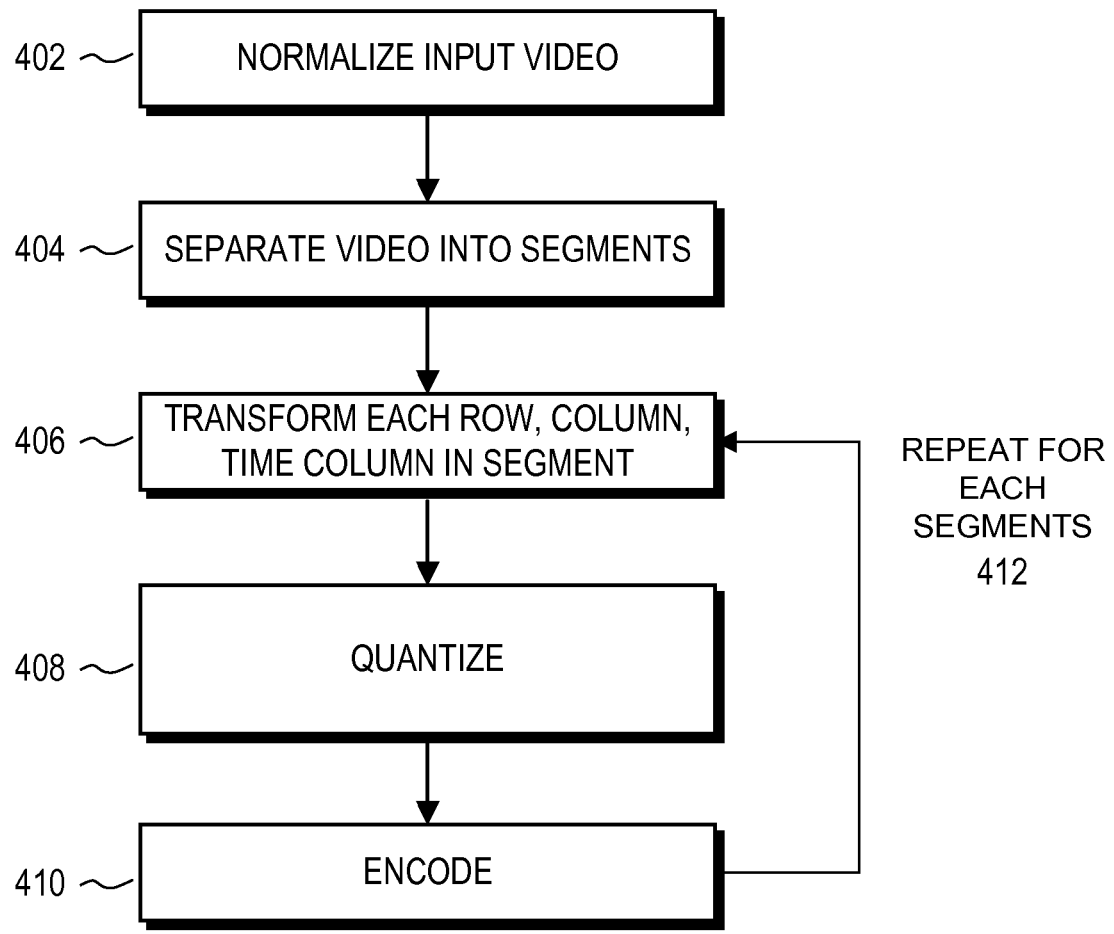
FIG. 4 is a flowchart illustrating a process for generating a video fingerprint.

Referring now to FIG. 4, a flowchart illustrates a process for generating a fingerprint sequence using the fingerprinting module 106. An input video is received by the fingerprinting module 106 and normalized 402 by the normalization module 210. Here, the frame size converter 214 scales down the size of the received video frames. The converted frames have a fixed number of pixels across the row and column of each frame. The color converter 216 generally reduces the color information in the video for example by converting to a grayscale such that each pixel is represented by a single luminance value.

Figure 5:
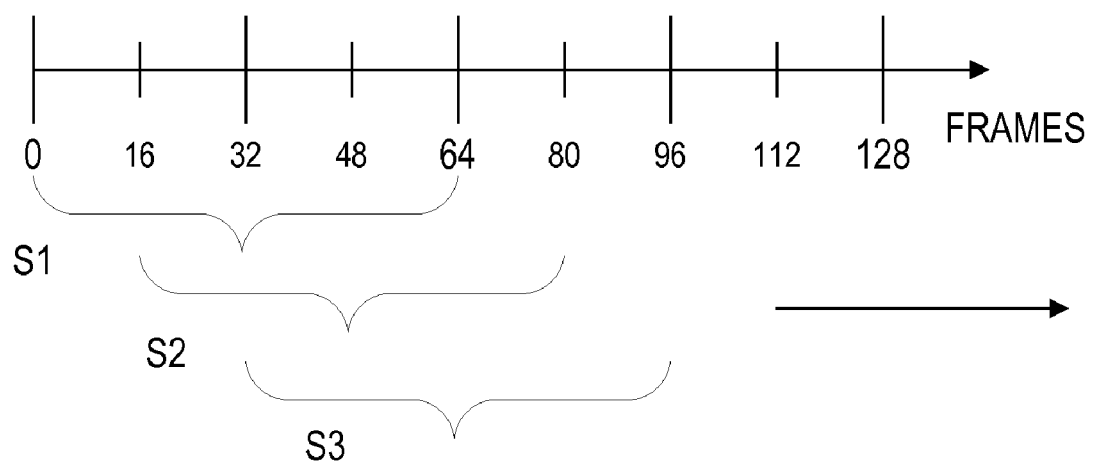
FIG. 5 is a diagram illustrating a technique for segmenting a video into overlapping segments.

The segmenting module 220 separates 404 the normalized video into a number of segments of consecutive video frames that may be overlapping. In one embodiment, each video segment includes the same number of video frames, typically, the number being equal to $2^n$ where, n is an integer. Furthermore, the segments of video frames preferably overlap by a fixed number of frames. For example, referring now to FIG. 5, an axis is illustrated representing the numbered sequence of frames in a video file, with three segments S1, S2, and S3, each having 64 frames, and having 16 frames between the start of each segment. A first segment S1 is illustrated comprising frames 0-63, a second segment S2 comprises frames 16-79 and a third segment S3 comprises frames 32-95. Additional segments may be similarly obtained from the video. According to various other embodiments, a video segment may comprise a different number of frames and segments may overlap by any number of frames. Furthermore, a video may be segmented into segments of varying length or varying overlap.

Referring again to FIG. 4, the transform module 230 transforms 406 the video segment by applying a three-dimensional transform to the group of frames in the video segment. A transform is applied to each row, column, and time column for a video segment by the row transformer 232, column transformer 234, and time column transformer 236 respectively. Here, a row refers to a set of pixels aligned in the horizontal (X) direction of a video frame and a column refers to a set of pixels aligned in a vertical direction (Y) of a video frame. A time column refers to a set of pixels having the same horizontal and vertical location within a frame, but belonging to different frames (Z direction). In one embodiment, the row transformer, column transformer, and time column transformer apply identical mathematical functions but operate on different dimensions of the received video segment.

Figure 6:
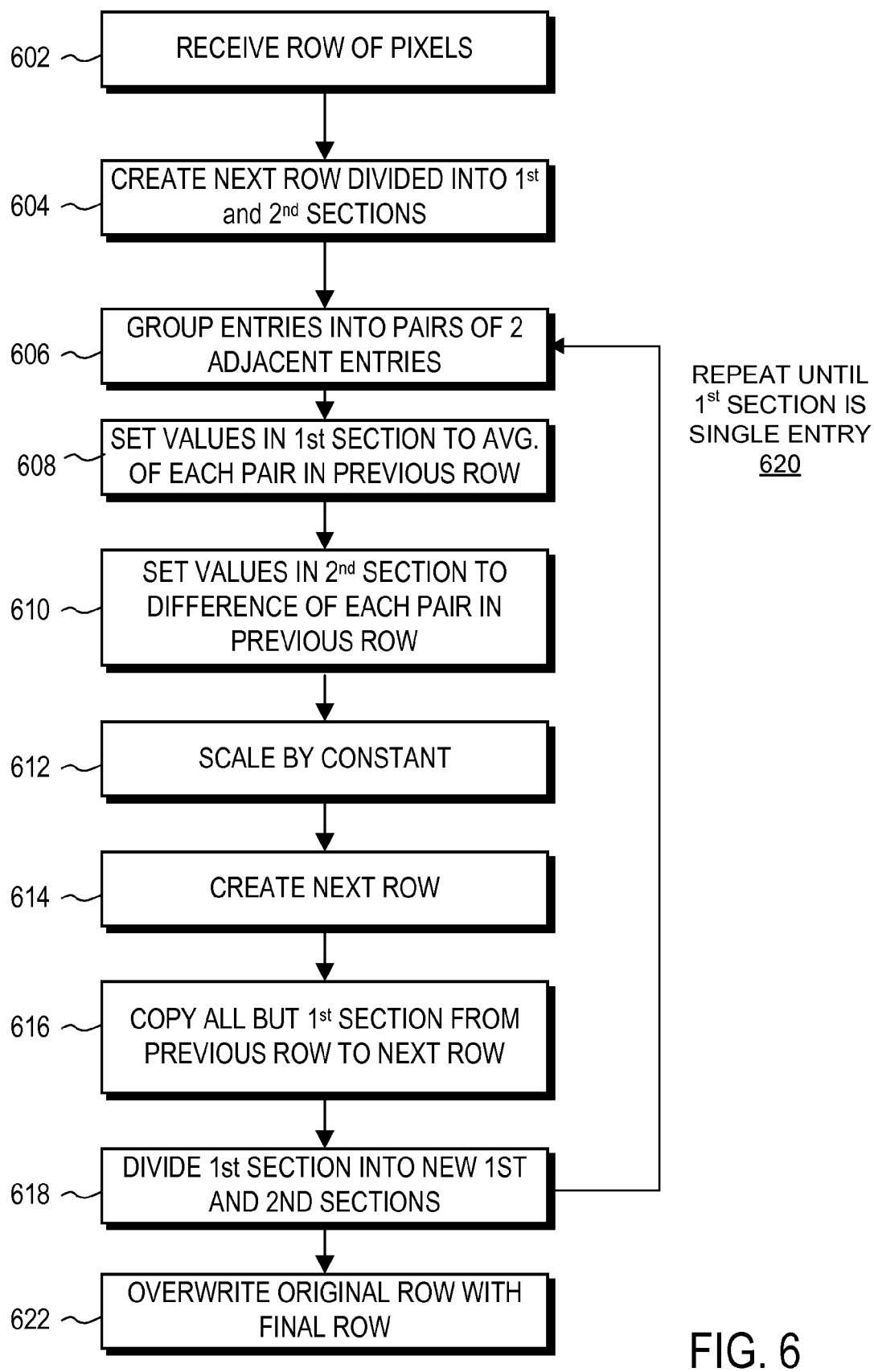
FIG. 6 is a flowchart illustrating a process for computing a transform used in generating a video fingerprint.

In one embodiment, the row transformer 232, column transformer 234, and time column transformer 236 each apply a Haar wavelet transform across their respective dimensions. In alternative embodiments, different types of transforms may be used such as, for example, a Gabor transform, or other related transform. FIG. 6 illustrates an example process for transforming a row of the video segment by applying a Haar wavelet transform. It is noted that different processes other than the process illustrated can be used to compute a Haar wavelet transform. The process in FIG. 6 can be viewed in conjunction with FIG. 7 which graphically illustrates the intermediate results of the transform at various stages of the process. For the purpose of illustration, the Haar wavelet transform is conceptually illustrated in FIG. 7 for a row of 8 pixels. It will be apparent to one of ordinary skill that described technique can be extended to any size row. Furthermore, the transform is not limited to a row, but can be similarly applied to any column or time column.

A row of pixels is received 602 by the row transformer 232. In the example illustration of FIG. 7, the row 702 comprises 8 pixels having values A-H. The values A-H may represent, for example, the luminance value of the pixels or some other characteristic of the pixels such as color information. A new row 704 is created 604 with a length equal to the length of the original row 702. The new row 704 may be, for example, a temporary buffer in the row transformer 232 and does not correspond to an actual row of pixels in the video segment. Pixels in the previous row (i.e. the original row 702) are grouped 606 into pairs, with each pair comprising two adjacent pixels. For example pixel A and B form a first pair 712, pixels C and D form a second pair, and so on. Values in the first section of the new row (e.g., the left half) are set 608 to be the sums of each pair in the previous row. For example, the first entry is set to (A+B), the second entry set to (C+D), and so on for the first four elements of row 704. Values in the second section (e.g., the right half) are set 610 to the differences of each pair in the previous row 702. For example, the $5^{th}$ entry is set to (A−B), the $6^{th}$ entry is set to (C−D), and so on. In step 612, all or some of the entries may be scaled by a constant value. Scaling by one-half in the summed entries, for example, will provide an average of the values.

In step 614, the next row 706 is created. In the new row, all values are copied 616 to from the values in the previous row 704 except for values in the $1^{st}$ section. Thus, entries 5-8 in row 706 are equivalent to entries 608 in row 704. The first section of the new row 706 is divided 618 into a new first and second section of equal size. The process then repeats 620 back to step 606 and iterates until the first section is a single entry and cannot be divided any further. The final values of the entries are illustrated in row 708. The final row 708 then overwrites 622 the original row 702. In this way, when the transforms for the other dimensions are applied (column, and time column), they are applied to the results of the transform in the previous dimension (not the original pixels). It is noted that in different embodiments, transforms may be applied to the dimensions in any order. Furthermore, in alternate variations, the sums and/or differences of pairs can instead include some other aggregate function, such as an average function.

The resulting values in 708 provide information relating to edge differences in the original row of pixels 702. As can be seen, the first value of 708 represents a sum of all the pixels in the original row 702. The second value represents the difference between the sum of values in the first half and the sum of values in the second half of original row 702. The third value represent the difference between the first quarter and second quarter, the fourth value represents the difference between the third quarter and fourth quarter, and so on. These values provide edge information since edges correspond to differences in luminance value, at varying frequencies with the first entry corresponding to the lowest frequency edges and the last entries corresponding to the highest frequencies. Note that some of the values will be positive, some will be negative, and many will be close or equal to zero.

Alternate techniques can be used to compute the Haar wavelet transform. For example techniques using boxlets, summed-area tables, or integral images may be utilized. In one technique, partial sums are first formed across the original row of pixels. In the partial sum, the value stored at a particular pixel location is equal to the sum of that pixel's luminance value plus the luminance values of all previous pixels. It is observed that the values in 708 are the differences between the sums of adjacent ranges of the original pixels. Then, the entries in the final result 708 can be computed directly by the differences of two partial sums.

Figure 7:
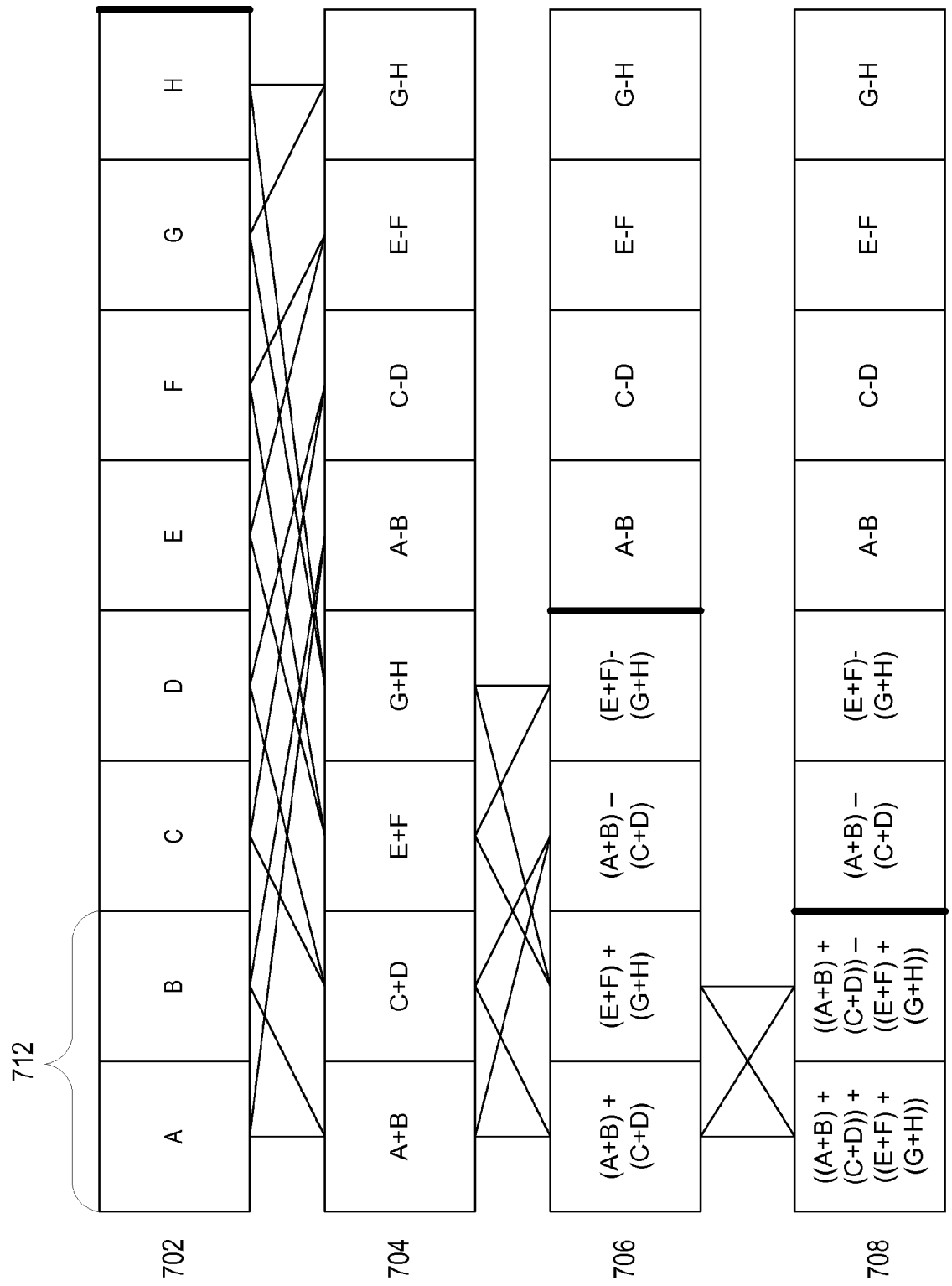
FIG. 7 is a diagram illustrating computation of a transform used in generating a video fingerprint.

The transform process of FIGS. 6 and 7 is repeated for each row, column, and time column in the video segment by the respective transform modules. The result in a three-dimensional array of coefficients that represents the spatial and sequential characteristics of all frames in the segment, and which is outputted by the transform module 230.

Referring again to FIG. 4, the quantization module 240 quantizes 408 the three-dimensionally transformed segment. Various quantization techniques are possible. For example, in one quantization process, the quantization module 240 determines the N coefficients with the largest absolute values; N may be a predetermined number or may be determined dynamically based on various constraints. The quantization module 240 quantizes the N coefficients to +1 or −1 by preserving the signs of the coefficients and sets the remaining coefficients to zero. In a second example, coefficients are quantized by comparing the magnitude of each coefficient to a predetermined threshold value. Any coefficient with a magnitude greater than the threshold value is quantized to +1 or −1 by preserving its sign, and the remaining coefficients are set to zero. In a third example quantization process, constraints are placed on both the number of coefficient and their magnitudes. In this process, the quantization module 240 quantizes only the N greatest coefficients that have a magnitude greater than a threshold value to +1 or −1, and sets the remaining coefficients to zero.

As part of the quantizing process, the quantization module 240 encodes 410 the three-dimensional coefficient array and flattens the array to a one-dimensional bit vector. If, for example, each bit is quantized to +1, −1, or 0 a two-bit encoding scheme uses the bits 10 for +1, 01 for −1, and 00 for zero. Various other encoding techniques are possible without departing from the scope of the invention. The output of the quantization module 240 is a quantized and encoded bit vector that forms a fingerprint for a single video segment.

The fingerprinting process then repeats 412 for each video segment in the video. The ordered set of video fingerprints generated by the process forms a fingerprint sequence for the entire video file. A fingerprint sequence can be compared to a reference fingerprint sequence by counting the number of differences between the bits in the respective sequences. This comparison provides a good indication of the similarity between the videos associated with the fingerprint sequences.

Figure 8:
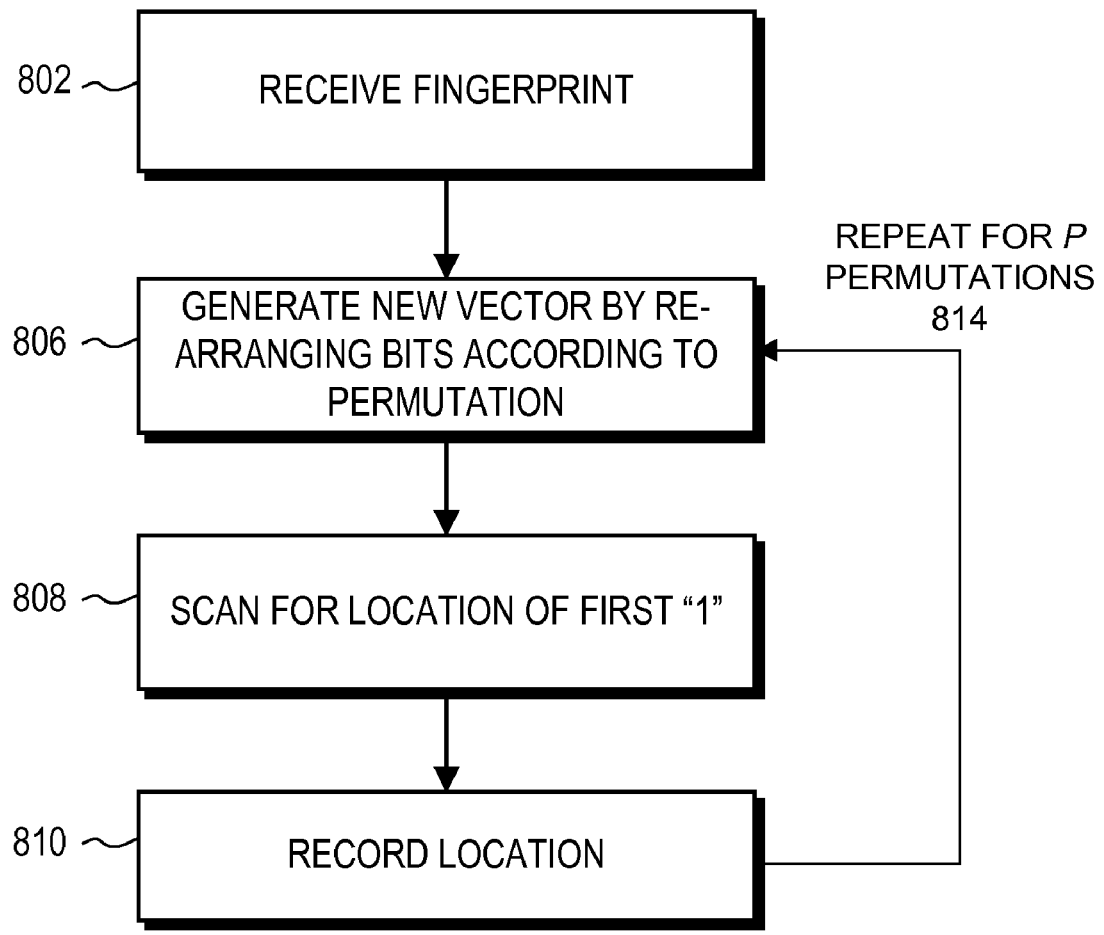
FIG. 8 is a flowchart illustrating a process for indexing video fingerprints.

In order to reduce the number of bit comparisons when comparing fingerprints to each other, the fingerprints are indexed by the indexing module 108. An example process for indexing uses a min-hash process as illustrated in FIG. 8. The min-hash process generates a "signature" for the video fingerprint by applying a set of P permutations to the bit values of the fingerprint. The signature contains fewer bits than the full fingerprint but retains most of the information in the associated fingerprint.

As described above, the video fingerprint is in the form of a bit vector that represents the flattened quantized three-dimensional transform results for an individual segment. Generally, the indexing module applies a number P permutations to the bits of the fingerprint. Each permutation defines a bit re-arrangement (e.g., bit swap) of the bits of the fingerprint; the permutation may be a random permutation or algorithmic. The permutations are preferably defined beforehand, but once defined the permutations are fixed and always applied in the same order.

Referring to FIG. 8, the indexing module 108 receives 802 a fingerprint for a video segment. A new bit vector is generated 806 by re-arranging the bits according to a first permutation $P_1$. A scanning module scans 808 for the location of the first bit value of "1" in the re-arranged bit vector and records 810 this location to a location vector. This process of permutation and location recording repeats 814 for all P permutations. Thus, each received fingerprint will have the same set of P permutations applied in the same order. The output is a location vector having P values, with each value indicating a location of the first bit value of "1" in the underlying fingerprint after applying each permutation. This set of locations provides the signature for the fingerprint.

The min-hash process described above can be further combined with locality sensitive hashing. In locality sensitive hashing, each signature is divided into a number of signature blocks and each signature block is placed into a different hash table. For each entry in the hash tables, unique identifiers of any video segment that generates that particular signature block are stored with the corresponding signature block.

Figure 9:
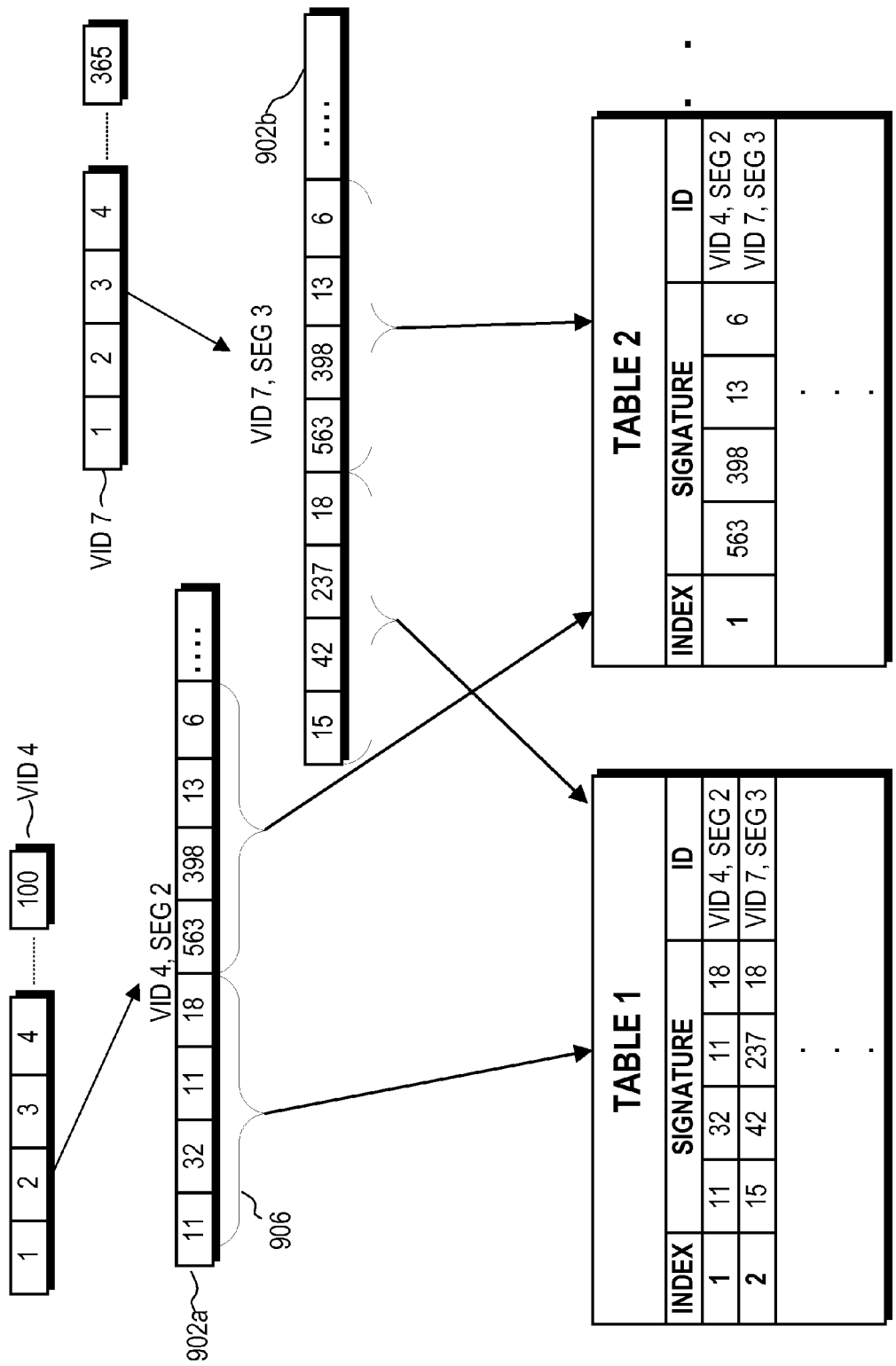
FIG. 9 illustrates an example of indexed video segments.

FIG. 9 illustrates an example of indexed fingerprints using the min-hash and locality sensitive hashing techniques described above. Two videos, VID 4 comprising 100 segments and VID 7 comprising 365 segments are shown. A first signature 902a corresponds to a first fingerprint of the second video segment of VID 4. The signature 902a is represented by a sequence of P locations (e.g., 11, 32, 11, 18 . . . ). The signature is broken into signature blocks 906 of four locations each. According to various embodiments, different sized signature blocks are used. A second signature 902b corresponds to the third video segment of VID 7. The first signature block in each signature 902 is mapped to table 1, the second signature block is mapped to table 2, and so on. The tables store each signature block and a unique identifier for all video segments that generated each particular signature block. The tables also associate an index number with each unique signature block representing an offset into the table, although the index number itself need not be explicitly stored. For example, table 1, index 1 corresponds to the signature block having the sequence 11, 32, 11, 18. In table 2, the signature block stored at index 1 corresponds to the sequence (563, 398, 13, 6). Because both VID 4 segment 2, and VID 7, segment 3 have this sequence as their second signature block, both segments are mapped to index 1. In practice, each video segment can be assigned a unique identifier, which is used in these tables in place of the tuple (video, segment).

Figure 10:
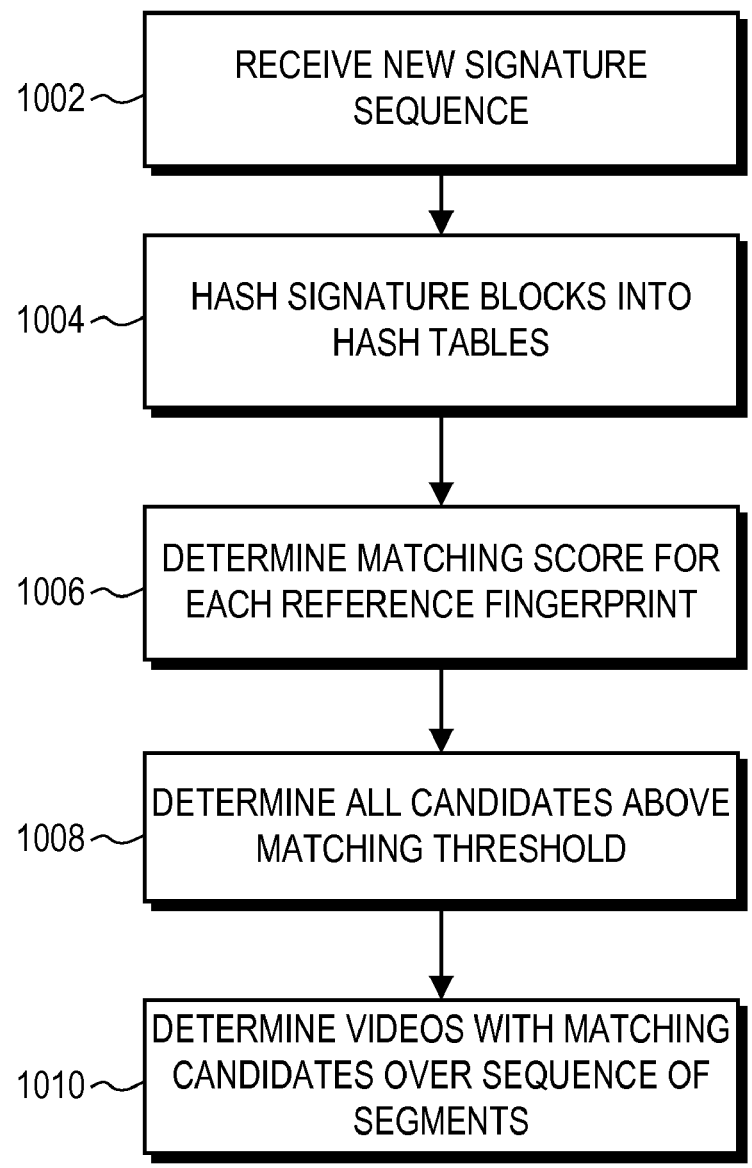
FIG. 10 is a flowchart illustrating a process for matching video fingerprints.

Once each video segment's signature is indexed for a collection of videos, the matching module 110 can be used to efficiently compare and match fingerprints of video files. Using the hash techniques described above, videos can be compared simply by comparing the index values of their signature blocks for each segment, rather than performing a bit-for-bit comparison of the entire fingerprint sequence. An example matching process is illustrated in FIG. 10.

In step 1002, a signature sequence (corresponding to the ordered signatures of a fingerprint sequence) for an ingested video is received by the matching module 110. Each signature block of a first signature in the signature sequence is hashed 1004 into the corresponding hash tables. For every matching signature block found in the table, a separate count is incremented for each unique video identifier associated with the matching signature block. Thus, each reference fingerprint maintains a separate count indicating the number of signature blocks of the reference fingerprint that match signature blocks of the first fingerprint of the ingest video. The counts are used to determine 1006 a matching score between the first fingerprint of the ingest video and each reference fingerprint of each video segment in the reference database 112. The matching scores are compared against a threshold value to determine 1008 all reference fingerprints having matching scores above the threshold. Reference fingerprints with matching scores above the threshold are designated as matching fingerprints. This process then repeats for each individual fingerprint of the fingerprint sequence of the ingest video.

Once all matching fingerprints are found for the fingerprints of the ingest video, matching is performed at the sequence level. In one method, the matching module 110 determines the reference video with the longest consecutive sequence of fingerprints that match the fingerprint sequence of the ingest video. Because each fingerprint corresponds to a time segment of video, this method determines a reference video that matches the ingest video over the longest consecutive time period.

Alternative sequence matching methods may also be used. In another example method, a fixed length window of time (e.g., 15 seconds) is designated for the ingest video. The fixed length window of time corresponds to a block of fingerprints in the fingerprint sequence of the ingest video. For a reference video having matching segments, time offsets are determined between each matching segment of the reference video and the corresponding segments of the ingest video. Each matching pair of segments casts a "vote" for a particular time offset. The votes are counted across all matching pairs and the reference window with the highest number of votes is designated as the best match.

The systems and methods described above enable indexing a video library using video fingerprints and matching video content based on spatial and sequential characteristics of the video. This is particularly useful, for example, in finding and removing duplicate video content and preventing sharing of copyright protected content. Moreover, the methods can be performed automatically and are therefore more efficient and cost effective than conventional techniques. The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Furthermore, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method for fingerprinting a video having a plurality of video segments, comprising:
   receiving a first video segment having a plurality of video frames;
   performing a three-dimensional transform on the plurality of frames to generate a three-dimensional wavelet, wherein the three-dimensional wavelet represents spatial information within the video frames and sequential characteristics between the video frames;

quantizing coefficients of the three-dimensional wavelet to generate a video fingerprint representing visual content of the first video segment;

storing the video fingerprint to a non-transitory computer readable storage medium; and storing an association between an identifier of the first video segment and features of the video fingerprint to the non-transitory computer readable storage medium.

2. The method of claim 1, wherein performing the three-dimensional transform on the plurality of frames comprises performing a Haar wavelet transform on each row, column, and time column of the plurality of frames.

3. The method of claim 1, further comprising:
encoding and flattening the three-dimensional wavelet to a one-dimensional structure.

4. The method of claim 1, further comprising normalizing the plurality of frames by converting at least one of frame size, frame rate, and color information to a standard format.

5. The method of claim 1, further comprising segmenting a video into a plurality of video segments including the first video segment and a second video segment, wherein the second video segment overlaps the first video segment by one or more frames.

6. The method of claim 1, wherein quantizing coefficients of the three-dimensional wavelet comprises:
selecting a subset of N coefficients of the three-dimensional wavelet, where N is an integer;
setting negative coefficients of the N coefficients to a first fixed value;
setting positive coefficients of the N coefficients to a second fixed value; and
setting remaining coefficients of the three-dimensional wavelet to a third fixed value, wherein the remaining coefficients are not among the N coefficients.

7. The method of claim 6, wherein the first fixed value represents −1, the second fixed value represents +1, and the third fixed value represents zero.

8. The method of claim 6, wherein selecting the N coefficients comprises:
selecting N largest magnitude coefficients of the three-dimensional wavelet.

9. The method of claim 8, wherein selecting the N coefficients comprises:
selecting N coefficients having a magnitude greater than a threshold magnitude.

10. A non-transitory computer-readable storage medium storing instructions for fingerprinting a video having a plurality of video segments, the instructions when executed by a processor cause the processor to perform steps including:
receiving a first video segment having a plurality of video frames;
performing a three-dimensional transform on the plurality of frames to generate a three-dimensional wavelet, wherein the three-dimensional wavelet represents spatial information within the video frames and sequential characteristics between the video frames;
quantizing coefficients of the three-dimensional wavelet to generate a video fingerprint representing visual content of the first video segment;
storing the video fingerprint to a memory; and
storing an association between an identifier of the first video segment and features of the video fingerprint to the memory.

11. The non-transitory computer-readable storage medium of claim 10, wherein performing the three-dimensional transform on the plurality of frames comprises performing a Haar wavelet transform on each row, column, and time column of the plurality of frames.

12. The non-transitory computer-readable storage medium of claim 10, further comprising:
encoding and flattening the three-dimensional wavelet to a one-dimensional structure.

13. The non-transitory computer-readable storage medium of claim 10, the instructions when executed further causing the processor to normalize the plurality of frames by converting at least one of frame size, frame rate, and color information to a standard format.

14. The non-transitory computer-readable storage medium of claim 10, the instructions when executed further causing the processor to segment a video into a plurality of video segments including the first video segment and a second video segment, wherein the second video segment overlaps the first video segment by one or more frames.

15. The non-transitory computer-readable storage medium of claim 10, wherein quantizing the coefficients of the three-dimensional wavelet comprises:
selecting a subset of N coefficients of the three-dimensional wavelet, where N is an integer;
setting negative coefficients of the N coefficients to a first fixed value;
setting positive coefficients of the N coefficients to a second fixed value; and
setting remaining coefficients of the three-dimensional wavelet to a third fixed value, wherein the remaining coefficients are not among the N coefficients.

16. The non-transitory computer-readable storage medium of claim 15, wherein the first fixed value represents −1, the second fixed value represents +1, and the third fixed value represents zero.

17. The non-transitory computer-readable storage medium of claim 15, wherein selecting the N coefficients comprises:
selecting N largest magnitude coefficients of the three-dimensional wavelet.

18. The non-transitory computer-readable storage medium of claim 15, wherein selecting the N coefficients comprises:
selecting N coefficients having a magnitude greater than a threshold magnitude.

19. A computer system for generating a video fingerprint comprising:
one or more processors; and
a non-transitory computer readable storage medium storing computer-executable program modules executable by the one or more processors, the computer-executable program modules comprising:
an input module adapted to receive a video;
a segmenting module adapted to segment the video into a plurality of video segments including a first video segment, each segment including at least two frames;
a transform module adapted to perform a three-dimensional transform on the first video segment to generate a three-dimensional wavelet, wherein the three dimensional wavelet represents spatial characteristics and sequential characteristics of the at least two frames associated with the first video segment;
a quantizing module adapted to quantize coefficients of the three-dimensional wavelet to generate a video fingerprint representing visual content of the transformed first video segment; and
an output module adapted to store the video fingerprint to a memory and to store an association between an identifier of the first video segment and features of the video fingerprint.

20. The computer system of claim 19, wherein the quantization module is adapted to select a subset of N coefficients of the three-dimensional wavelet where N is an integer, set negative coefficients of the N coefficients to a first fixed value, set positive coefficients of the N coefficients to a second fixed value, and set remaining coefficients of the three-dimensional wavelet to a third fixed value, wherein the remaining coefficients are not among the N coefficients.

* * * * *